United States Patent [19]

Greenman et al.

[11] 4,235,657

[45] Nov. 25, 1980

[54] MELT TRANSFER WEB

[75] Inventors: Edwin G. Greenman; Gary L. Nilo, both of Neenah, Wis.

[73] Assignee: Kimberly Clark Corporation, Neenah, Wis.

[21] Appl. No.: 11,439

[22] Filed: Feb. 12, 1979

[51] Int. Cl.[2] .......................... B32B 3/18; B41M 3/12; B44C 1/16; B32B 7/06

[52] U.S. Cl. .......................................................156/234; 156/240; 156/249; 427/148; 428/200; 428/207; 428/211; 428/486; 428/488; 428/513; 428/518; 428/913; 428/914; 428/484

[58] Field of Search ............... 156/234, 239, 240, 249, 156/277; 427/148; 428/200, 211, 484–488, 511–516, 520, 522, 523, 537, 913, 914, 195, 207, 518

[56] References Cited

U.S. PATENT DOCUMENTS

| | | | |
|---|---|---|---|
| 2,970,076 | 1/1961 | Porth | 156/240 |
| 3,007,829 | 11/1961 | Akkeron | 427/148 X |
| 3,441,458 | 4/1969 | Milliken | 156/240 |
| 3,445,309 | 5/1969 | Milliken | 156/240 |
| 3,516,842 | 6/1970 | Klinker et al. | 428/240 |
| 3,794,544 | 2/1974 | Eckert et al. | 156/230 |
| 3,912,569 | 10/1975 | Kapral | 156/230 |
| 3,918,895 | 11/1975 | Mizuno | 8/2.5 |
| 3,944,695 | 3/1976 | Kosaka et al. | 427/148 X |
| 4,037,008 | 7/1977 | Tugwell | 428/200 |

FOREIGN PATENT DOCUMENTS

| | | |
|---|---|---|
| 1002818 | 1/1977 | Canada . |
| 1393992 | 5/1975 | United Kingdom . |
| 1523869 | 9/1978 | United Kingdom . |

OTHER PUBLICATIONS

Trans-Eze 300 Production Buyers' Guide of Kimberly-Clark Corp.

*Primary Examiner*—Bruce H. Hess
*Attorney, Agent, or Firm*—William D. Herrick; Wendell K. Fredericks

[57] ABSTRACT

A melt transfer web useful for transferring pre-printed inked graphic patterns onto natural or synthetic base fabric sheets, as well as other porous, semi-porous or non-porous material workpieces, is disclosed. The transfer web is comprised of a flexible, heat-stable substrate, preferably a saturated paper having a top surface coated with a first film layer of a given polymer serving as a heat-separable layer, and a second film layer superposed on the first film layer and comprised of another given polymer selected to cooperate with the first film layer to form a laminate having specific adhesion to porous, semi-porous or non-porous materials when heat softened. For use in the melt transfer process, the coated surface has printed thereon with compatible inks, any desired pattern or design.

Decorating or printing workpieces is effected by contacting the workpieces with the printed surface of the melt transfer web and hot pressing the assembly at a suitable temperature and pressure for a predetermined period of time, to transfer the polymeric laminate to the workpiece. While the assembly is still hot, the substrate is peeled away and the printed pattern along with the second film layer which now overcoats the pattern and a major portion of the first film layer which is released from the substrate during the peeling process are transferred onto the workpiece. The transferred first and second film layers adhesively bond the inked pattern onto the workpieces in a manner which does not substantially degrade the physical properties, touch, feel and washability of the workpiece.

12 Claims, 6 Drawing Figures

MELT TRANSFER WEB

BACKGROUND OF THE INVENTION

1. Field of the Invention

This invention relates to a novel melt transfer web employing a pair of cooperating polymeric coatings capable of releasing a pre-printed graphic pattern from a suitable substrate, transferring the pattern to a workpiece, and permanently bonding the pattern to the workpiece. It relates particularly to a melt transfer web in which hot pressing is employed to decorate or print the surfaces of workpieces comprised of natural or synthetic fibrous materials as well as almost any other porous, semi-porous or non-porous structures.

2. Description of the Prior Art

In prior art melt transfer systems, it is well-known to print a pattern with printing inks having a thermoplastic binder onto paper and then transferring this assembly onto a fabric under heat and pressure. Various releasable layer compositions have been configured to develop efficient graphic pattern transfers onto fibrous or textile material workpieces without damaging physical properties, feel, and touch of the fabric. Such systems were developed in an attempt to overcome the problems associated with satisfying temperature requirements which may vary over a wide range as well as to accommodate the various steps of forming the transfer paper and of performing the heat transfer itself.

One such transfer printing system for providing natural or synthetic fabric material with suitable patterns is described in U.S. Pat. No. 3,918,895 dated Nov. 11, 1975. The patent describes a transfer paper formed by: (1) coating on an optional support, a releasable layer comprising a pasty composition of a high melt-point resin and a solid solvent, the solvent being solid at room temperature and liquid at elevated temperatures where it is capable of dissolving the resin therein; and (2) then printing a pattern, using an ink composition containing a dye or pigment, on the releasable layer.

The patent then describes the transfer of the printed pattern to a fibrous material workpiece which is achieved by: (1) bringing the printed surface of the transfer paper into contact with the workpiece; (2) heating the assembly under pressure; (3) subjecting the workpiece to a dyeing treatment to cause the dye to be absorbed into the fibers of the workpiece; and (4) then subjecting the workpiece to a soaping treatment in order to remove the releasable ink-carrying layer, excessive ink and ink vehicle. If the printed pattern were to be transferred onto the fibrous workpiece by the above heat transfer treatment and the subsequent dyeing treatment not performed, the ink would be left in a sticky state on the surface of the workpiece which is undesirable. Accordingly, it is essential to provide the dyeing treatment as described in the patent to fix permanently the pattern on the fibers of the workpiece.

As is apparent from the foregoing description, the transfer printing system of the cited patent does not permit transfers to workpieces constructed from non-absorbent materials. Also, it is necessary to perform a soaping treatment to remove the transferred releasable coating and excess dye materials. The process as described in the patent thus requires both dyeing and soaping steps to be performed satisfactorily.

Another prior art system for melt transferring inked patterns to workpieces is described in a British Pat. No. 1,393,992 dated May 14, 1975, a corresponding Canadian Pat. No. 1,002,818 dated Jan. 4, 1977 and a corresponding U.S. Pat. No. 4,037,008 dated July 19, 1977. In these patents, a process for producing a flexible transfer lamination is described which is accomplished by: (1) applying a flexible transparent layer of a plastisol ink on a temporary backing sheet by a silk-screen printing method; (2) printing a flexible image layer with lithographic process ink to define an image on the first layer; and (3) applying a flexible plastisol adhesive layer to the image layer so that the three layers form a transfer lamination which can be adhesively applied to a flexible workpiece as a complete unit.

Such a product is suited only for transfer applications to fabrics of cotton and fiber blends which are relatively smooth. The process is not suited for applying patterns to fabrics such as terry cloth toweling or athletic socks. Moreover, plastisols and plastisol inks are not commercially used on nylon and other thermoplastic synthetic fabrics because plastisols will not adhere well enough to withstand washing and abrasion in use. Also, when printing with the flexible transfer lamination described in these patents, the workpiece must be cooled to allow the plastisol to solidify before the base sheet is removed. This involves a cooling step which is undesirable in situations where high productivity is wanted.

A further prior art product which uses polymer-coated transfer paper for hot-melt transfer of graphic patterns may be found in a product buyers guide provided by Kimberly-Clark Corporation describing TRANS-EZE TM 3000 heat transfer paper. Such paper has properties which permit lithographic, silk screen, flexographic, rotogravure, letter press, web-fed or sheet-fed offset printed patterns to be transferred to nylon, synthetic, nonwoven, and natural fabric articles. TRANS-EZE 3000 has a plastic-like surface coating which provides the printing and heat transfer surface. The plastic-like surface also serves as the transferable layer which softens during the heat transfer process and returns rapidly to the normal pliable plastic-like surface during the cooling step. In order to accomplish transfer, stripping of the base sheet while hot is required.

Such transfer paper can be used readily to effect heat transfers of patterns to porous woven or non-woven fabrics of natural or synthetic fibrous material such as 100% cotton, polyester blends, wool, nylon and synthetic non-wovens as well as porous poster boards, artificial leather, cork and the like. Fabrics, thus printed, still have good "hand", i.e., feel, and touch, and breathability while retaining good washability. However, this transfer paper does not produce a highly durable image on cotton fabrics which may be laundered to remove soil.

Another prior art transfer paper product is described in British Pat. No. 1,523,869 published Sept. 6, 1978. In that patent a transfer paper system is described which teaches sandwiching the printed characters to be transferred between two continuous polyurethane resin layers carried on a support so that upon heat transfer a bonding and a protective layer for the characters will be provided. However, the heat transfers in accordance with this transfer paper system are limited to applying labels to flexible articles and in particular textile materials.

SUMMARY

The present invention relates to a novel transfer web for hot-melt transfers of graphic patterns onto natural and synthetic fabrics as well as other porous, semi-porous, or nonporous material workpieces. The transfer web comprises a suitable flexible substrate coated with a first polymer film layer of a first composition and a different second polymer film layer of a second composition.

The first film layer has as main ingredients a vinyl resin and a polyethylene wax which are blended together in either a solvent or a liquid solution. A layer of the blend is coated while in a liquid state, onto a carrier web or substrate by a conventional coating method employing applicators such as plain surface rolls, gravure rolls, Mayer rods, air knives and the like. The weight of the applied coat preferably is about 7.5 lbs./1300 ft$^2$. This first coat is cooled to film form to room temperature. The first film layer serves as the releasable or separable layer during heat transfer and after transfer provides an additional protective polymer coating layer for the graphics.

The second polymeric film layer is an ionomer which is in an aqueous dispersion. A suitable ionomer such as the one sold under the trade designation 56220 Surlyn ® Ionomer Dispersion by E. I. DuPont deNemours and Company of Wilmington, Del., in liquid form, is coated at room temperature over the first film layer, also by a conventional coating method to form the second film layer preferably having a weight of about 1.5 lbs/1300 ft$^2$. This second film layer has a potentially adhesive property for permanently securing the transferred graphics to the workpiece. The adherent property of the second film layer is actuated when both the first and second film layers are heated and placed in pressure contact with the workpiece.

An inked pattern, formed with an ink composition suitably selected by sample evaluations to be compatible with the type of workpiece to which it is to be transferred, is applied onto a top surface of the second film layer by conventional printing method such as gravure, flexographic, lithographic, screen or manual printing. The printed melt transfer web is now ready for the hot press transfer process of the pattern onto the workpieces.

In the process of printing workpieces using the melt transfer web of this invention the printed surface of the transfer web is brought into contact with a natural or synthetic material workpiece and this assembly is heated under pressure for a predetermined period of time. Heating rolls, hot platens or plates may be utilized for applying the heat and pressure. The applied heat releases the first film layer from the substrate while activating the adhesive property of the second film layer and thereby transfers the printed pattern and a major part of the first layer along with the second film layer onto the workpiece. The second film layer securely bonds the printed pattern to the workpiece while additionally serving as a protective layer for the pattern. The partially transferred first film layer provides additional protection.

In the case of fibrous articles, after a graphic transfer using the present inventive system, the properties of the transferred film layers are such that the touch and feel of the flexible workpiece material is not degraded. When the workpiece is a fabric, the washability of the fabric is enhanced as compared to prior art heat transfer systems, permitting repeated washings of as much as 25 times when using 51.5° C. or 125° F. water and a mild detergent. Such washing does not substantially detract from the permanency of the transferred graphics.

BRIEF DESCRIPTION OF THE DRAWINGS

In the accompanying drawing, comprised of enlarged or exaggerated figures for purposes of illustration, in which like numerals represent like parts of the several views.

DESCRIPTION OF THE PREFERRED EMBODIMENT

Figure 1:
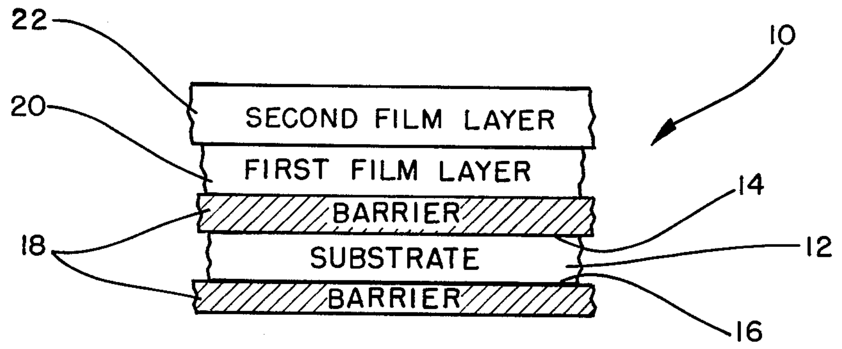
FIG. 1 provides a fragmentary sectional view of a substrate with barrier coatings and polymer film layers which forms a melt transfer web in accordance with this invention.

Referring to the drawing for the purpose of illustrating the invention, there is shown in FIG. 1, a fragmentary section of a melt transfer web 10 which includes a carrier web or substrate 12, barrier coats 18—18, first film layer 20 and second film layer 22.

Substrate 12 is a thin flexible, but non-elastic, sheet material such as one of the various paper webs, plastic film or metal foils customarily employed in heat transfer paper which are unaffected by thermal conditions occurring during the heat transfer steps. For economy reasons, it is preferred that the substrate 12 be a paper web, saturated with a non-staining and non-thermosetting polymer. Illustratively, the preferred paper web is a water leaf sheet of wood pulp fibers or alpha pulp fibers saturated with a reactive acrylic polymer such as the product sold under the trade designation Hycar ® 2600×104 manufactured and sold in latex form by B. F. Goodrich Chemical Company of Cleveland, Ohio. A preferred base sheet has a basis weight of about 14.2 lbs/1300 ft$^2$ before saturation. The saturated paper preferably contains 30 parts polymer per 100 parts fiber by weight, and has a basis weight of 18.5 lbs/1300 ft$^2$. A suitable caliper is 4.1 mils±0.5 mil.

A saturated paper web with the above properties provides a reasonably low cost web having suitable tensile strength and resistance against delamination to serve as a substrate for an improved melt transfer paper.

When using a saturated paper a top and a bottom surface 14 and 16 respectively, of substrate 12 each has a passive barrier coating material applied thereon as indicated at 18—18. The barrier coat 18 on top surface 14 prevents penetration between the fibers of the web of the active coating material applied at a later stage. The barrier coat 18 on the top surface 14 also helps aid easy release of the active coating materials during the heat transfer steps. The barrier coat 18 on the bottom surface 16 serves primarily to provide dimensional stability to balance the sheet structure, and prevent curl which would occur if substrate 12 were coated on only one side. A non-curling web is necessary particularly when printed patterns are applied to the transfer web by an offset printing process. Both barrier coats covering the fibers of the web are further needed to prevent the occurrence of curl during the heat transfer process due to the loss of moisture from the web by evaporation.

A useful barrier coating composition may be comprised of a polymeric binder and a clay mixture. Illustratively one such coating is comprised of a mixture of 25 to 50 parts of a polymeric acrylic latex with 100 parts of clay such as the clay sold under the trade designation Ultrawhite ® 90 of Engelhard Mineral and Chemical Division of Mineral Park Edison, N.J. A suitable acrylic polymer is a self-crosslinking polymer sold under the trade designation of Rhoplex ® HA-16 of Rohm and Haas Company of Philadelphia, Penn. supplied as a nonionic latex. Other polymeric binders such as butadiene-styrene, butadiene-acrylonitrile and polyvinyl acetate may be used with the clay; however, the separable polymeric film disposed over the barrier coat 18 does not release as effectively from these binders as it does from the binder formed from Rhoplex ® HA-16. Known coating means are used to apply the barrier coat weighing 3 to 5 lbs./1300 $ft^2$.

First film layer 20, a heat transfer polymer, is disposed on coat 18, covering surface 14 of substrate 12. The preferred heat transfer polymer is a combination of a vinyl resin admixed with a polyethylene wax. Admixing is performed by heating the resin and wax mix in a solvent such as toluene or a diluent such as odorless mineral spirits at a ratio of 70% solids to 30% liquids, until the mixture is homogeneous. When toluene is used, the mixture should be brought to a preferred temperature of from 82.2° to 96° C. or 180° to 205° F. to cause the resin to dissolve and liquify. When odorless mineral spirits is used, a dilution of the resin will occur without the creation of toxic fumes when heated within the above temperature range.

Typical compositions of the first coat may be any combination of the following components:

| | Parts | % VA | Melt Index | Molecular Weight | Ring and Ball Softening Pt. °F. |
|---|---|---|---|---|---|
| EVA 501 | 100 to 60 | 28% | 350 | — | 180 |
| EVA 505 | 0 to 40 | 28% | 20 | — | 230 |
| Epolene ® E14 | 20 to 80 | — | — | 1800 | 218 |

EVA is an abbreviation for copolymers of ethylene vinyl acetate.

The EVA 501 and 505, supplied as copolymers consisting of vinyl acetate (VA) and ethylene (E), are products of Union Carbide Corporation.

"Epolene ® E14" is the registered trademark of a polyethylene wax product of Eastman Chemical Products Inc. of Kingsport, Tennessee that softens at a temperature of around 104° C. or 218° F.

Other commercially available copolymers of ethylene and vinyl acetate may be used to formulate the blend of copolymers for the first film layer provided the proportions of VA in the copolymer ranges from $\approx$17% to 33%, the melt index (as measured by the procedure of ASTN D1238) ranges from about 5 to 465, the resin density ranges from about 0.933 to about 0.954 gm/cc, and the ring and ball softening point as measured by the procedure of ASTM E28 ranges from about 180° F. to about 310° F.

The "Epolene E14" is a carboxylated polyethylene wax which provides desirable water receptivity properties to the copolymers when mixed therewith causing the first film layer to have improved surface qualities for receiving the second film layer when applied from a water vehicle.

Other waxes with melt properties similar to "Epolene E14" may be mixed with the EVA copolymers in formulating a suitable first film layer. For example, a non-carboxylated polyethylene wax such as Epolene ® N-14 may be used without substantially affecting the useful properties of the first layer. Thus the polyethylene waxes may be either emulsifiable (in first film layer compositions which would be coated subsequently with the water based second film layer) or non-emulsifiable should the second film layer be applied by a melt extrusion process. Suitable polyethylene waxes may vary in molecular weight from about 1800 to about 8000, in ring and ball softening points from about 100° C. to about 120° C., in densities from about 0.906 to 0.964 gm/cc at 25° C. and in viscosity from about 230 to 1800 centipoise as measured per Brooksfield Viscosity, #3 spindle at 6 rpms.

Figure 2:
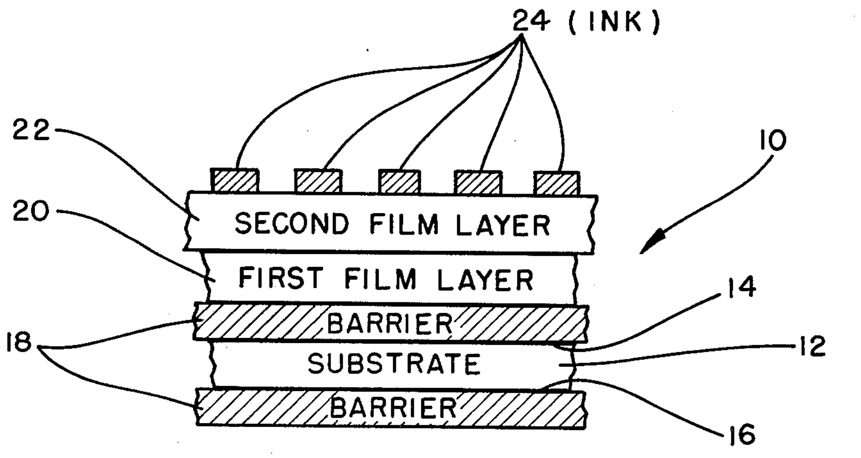
FIG. 2 is a fragmentary sectional view of the melt transfer web of FIG. 1 with a printed pattern applied to the top surface.

If the transfer paper 10 is to be printed to form an inked pattern as illustrated in FIG. 2 by lithography, polymers free of antioxidants are preferred to prevent the inks from setting off. When an antioxidant is present in the polymer the inks are inhibited from drying to a tack-free state which is desirable. Ink compositions may have to be specially compounded to print well on a press should antioxidants be used in the polymers of the first layer or in the saturating polymer.

When the preferred vinyl resin and emulsifiable polyethylene wax materials are blended together in heated solvent, a hot water-thin, clear solution is formed which can be applied uniformly over the barrier coat 18 on the top surface 14 of the substrate 12. Any coating method such as air knife or gravure rollers may be used, however, the preferred method is Mayer rod which is a wound wire rod applicator. The weight of first film layer may be in the range of from about 3 to 10 lbs./1300 $ft^2$. At room temperature, the applied polymer coat sets to form first film layer 20. Under heat treatment during the transfer process, first film layer 20 will release from barrier coat 18 to permit transfer of both film layers and the graphics to the workpiece. After transfer, layer 20 serves as an additional protective polymer layer for the graphics.

After the first film layer 20 is applied, and set, a second film layer 22 of a different type polymer is superposed on it. The preferred polymer used for the second film is an ionomer, illustratively, 56220 Surlyn ® Ionomer Dispersion. The ionomer as applied in latex form is approximately 30% resin and 70% water. Other series of Surlyn ® from E. I. DuPont such as the trade designations 56230 Surlyn ® Ionomer Dispersion and 56256 Surlyn ® Ionomer Dispersion Primer may be used for the second film. Should another second film application mode be desired, ionomers such as described in U.S. Pat. No. 3,264,272 and U.S. Pat. No. 3,904,806 may be applied by melt extrusion. In a similar fashion, ethylene-acrylic acid (EAA) copolymers having an acrylic acid content of about 17% to 20%, and a melt index of from about 300 to 500 may be used if application from a water based system is preferred. Should an extrusion second film application mode be desired, the EAA polymer may have acrylic acid contents varying from about 3% to about 15% with melt indexes ranging from about 2 to about 11. Alternatively, an ethylene acrylic acid (EAA) copolymer with an acrylic acid content of from 17 to 20% and a melt index of from about 300 to 500 may be used if application from a water system is preferred. A preferred weight range for the second film layers is from 1 to 4 lbs/1300 ft$^2$ will provide an ideal weight ratio of 7:1 between the first and second film layers. The second film layer is applied over the first film layer by standard coating methods. After the coating is applied, the water content of the ionomer or of the EAA evaporates by the use of heat during the application. A slight melt of the ionomer or EAA occurs and a heterogeneous mix or a mechanical bond of the first and second films is formed at the interface. A similar bond forms between the first and second film should the melt extrusion mode for the second film be used.

The ink compositions used to print a pattern 24 over the second film layer are preferably thermoplastic; and of a nature which will soften at the same time as do the first and second film layers during hot pressing. Conventional vehicles or binders for the inks may be employed in this invention; however, for offset printing, a non-oxidizing ink and binder must be used. As for the other forms of printing such as rotogravure, silk screen or flexography, the physical properties of the ink and binder may be varied to be compatible with the particular structure of the workpiece, the patterns to be printed, and the heat transfer conditions existing during the pattern transfer step.

The melt transfer web structure of FIGS. 1 and 2 is suitable for printing natural and synthetic fabric substrates varying from woven or nonwoven polypropylene to nylon, polyester, rayon, silk, and cotton, as well as large variety of other porous semi-porous and non-porous materials such as leather, hardboard, wallboard, plasterboard, plastics, etc.

As indicated earlier, transfers, using the transfer webs of this invention, are made by the application of heat and pressure. Typical conditions for such transfer are about 178° C. or 350° F. for 5 to 15 seconds at 1–3 psi. Temperature and time may be varied depending upon the particular workpiece. Many variations in the polymer films, inks, and substrates employed in the transfer web of this invention may be utilized to optimize the transfer qualities for specific materials to be decorated or printed.

Figure 3:
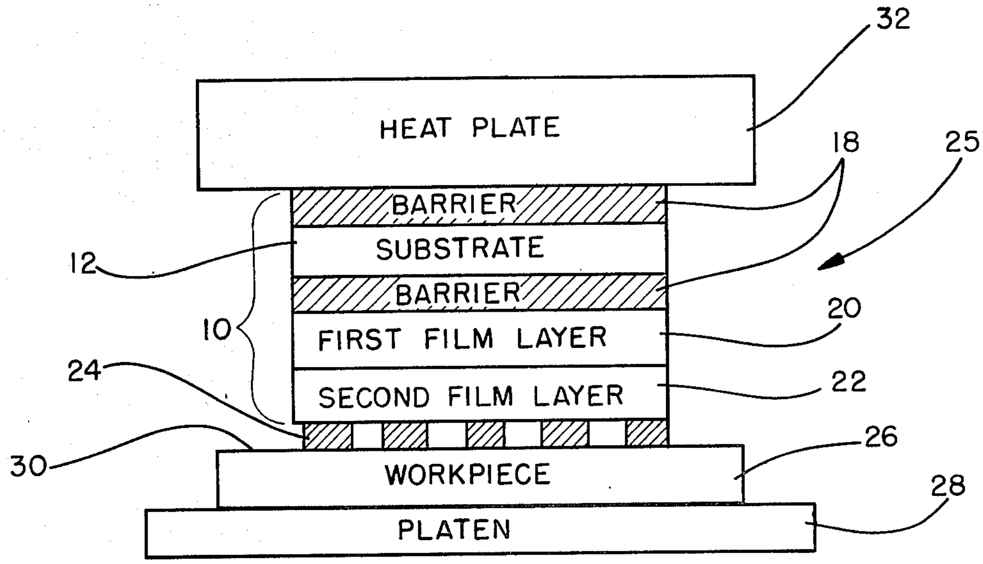
FIG. 3 is a sectional view of the melt transfer paper of FIG. 2 assembled in a hot press with a workpiece ready for the transfer process.
Figure 4:
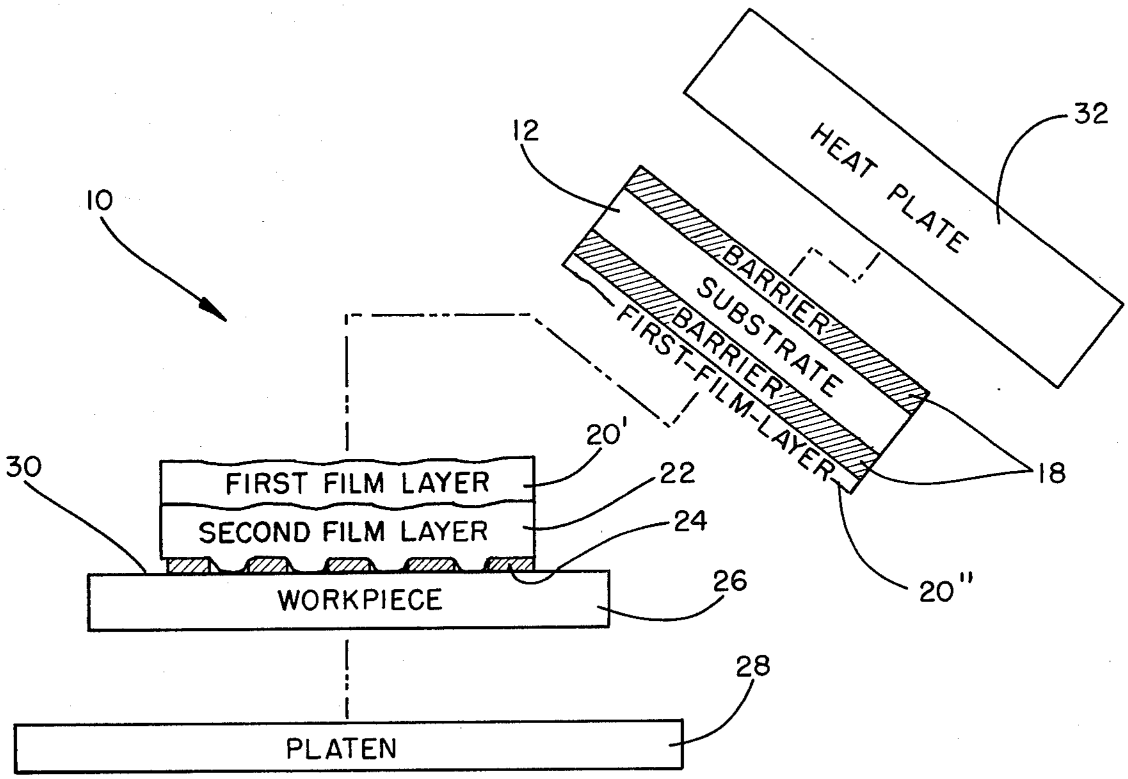
FIG. 4 is a schematic sectional view illustrating one example of the method of transferring an inked pattern onto a non-absorbent material workpiece in accordance with this invention.

The heat transfer operation for this novel transfer web system will now be discussed. As shown in FIG. 3, the workpiece 26 which may be in the form of a web or an object to be decorated or printed is arranged on a platen 28 such that a region 30 of the workpiece 26 is fully exposed to a heat plate 32. Assume for illustrative purposes that the workpiece 26 is a non-absorbent, non-porous structure such as a ceiling tile, or a piece of metal or plastic. A sheet of the transfer web structure 10 of this invention is positioned so that the selected pattern 24 is in registry and in contact with the region 30 to form an assembly 25. The heat plate 32 heated to a preferred temperature of about 178° C. or 350° F. is placed in contact with the barrier coating 18 on the nontransfer surface of the transfer web 10. The plate 32 is forced against the transfer web at a preferred pressure of from 1 to 3 pounds per square inch for a period of from 5 to 15 seconds to hot press the assembly 25. Afterwards, the plate 32 is removed as illustrated in FIG. 4, the substrate 12 is peeled away from the transferred film layers while the layers are still hot.

Figure 5:
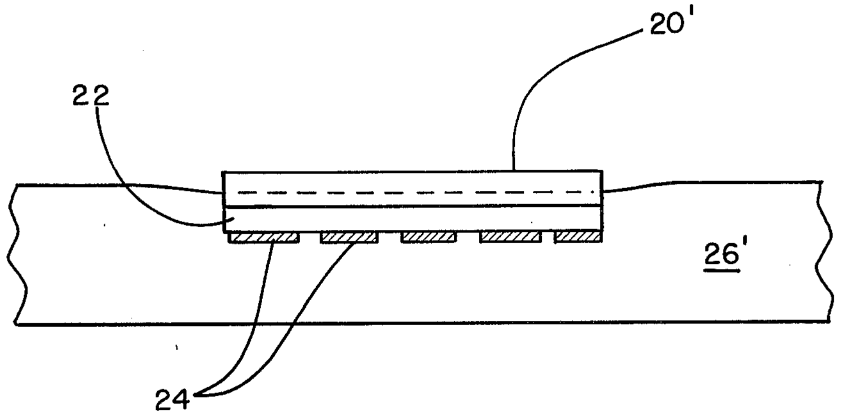
FIG. 5 is a sectional view illustrating a fabric material workpiece decorated or printed by the process of this invention.

As the substrate 12 is removed, a major portion of the first film layer 20 is retained by the workpiece designated 20' leaving approximately 5 to 10% by weight of the first film 20, designated 20'', intact with the barrier coat 18 of substrate 12. All of the printed pattern 24, the major portion 20' of the first film layer 20 and all of the second film layer 22 are transferred to surface 30 of workpiece 26. The transferred portion of first film layer 20' and second film layer 22 overcoat the inked pattern 24 forming a bonding layer during the transfer. As illustrated in FIG. 5, in the case of a fabric workpiece 26, the ink composition forming the pattern 24 is pushed into the fabric where second film layer 22 adheres to the fabric.

An unusual but unexplained result which is obtained by using two layers of film in the transfer web structure is that better adhesion to fabrics, such as cotton and cotton-synthetic blends or synthetics alone as well as a large variety of other products, such as hardboard, building board, brick, plastic sheets and the like may be realized then if only the first film layer is employed. If the second film layer 22, an ionomer is used alone, the transfer property is not realized without degradation of the workpiece and the substrate 12. Also in the case of fibrous material articles, it is surprising that after the pattern is transferred along with the film layers the touch, feel and breathability of the decorated material is not substantially degraded and the washability is enhanced. Such results are not obtained when melt transfer webs are used which employ only a single film layer having a similar constituent makeup as that of the preferred first film layer of this invention.

Figure 6:
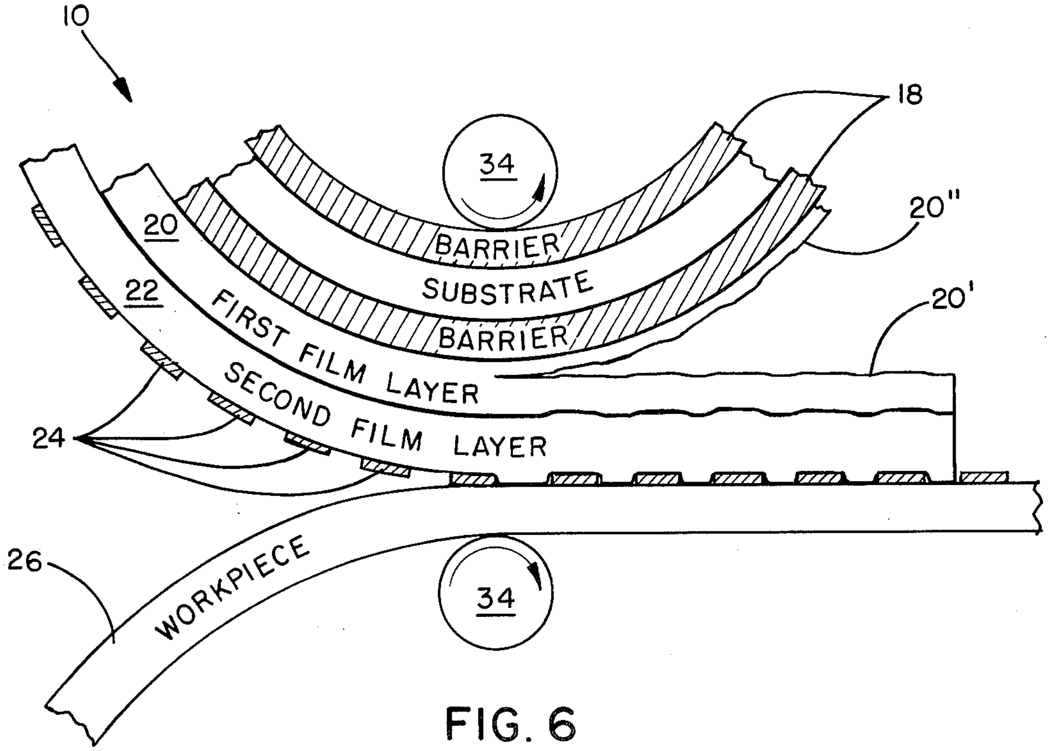
FIG. 6 illustrates an alternate method for transferring a pattern from the melt transfer web onto a non-absorbent material workpiece in accordance with the principles of the present invention using heated rolls to supply the required heat and pressure.

It should be recognized that other continuous heating means such as the hot rollers 34 and 34' of FIG. 6 may be used to effect the heat transfer.

EXAMPLE 1—(Manufacture of the melt transfer paper.)

A fiber web composed of 100% bleached kraft spruce fibers and having a weight of 14.5 lbs./1300 ft$^2$ was saturated in the manner described previously with 30 parts of Hycar ® (2600×104) reactive acrylic polymer per 100 parts by weight of fiber of the web to obtain a saturated web having a basis weight of 18.5 lbs./1300 ft$^2$ and at an average caliper of about 4 mils. The excess saturants were removed by squeeze rollers and the web dried.

The dried saturated web was then passed over a coating roll running in a supply trough containing a mixture of 25 to 50 parts of Rhoplex ® Ha16 with 100 parts of Ultrawhite 90 clay to form a saturated web having a barrier coat on both the top and bottom surfaces.

An admixture of resin and polyethylene was formed by heating in odorless mineral spirits, 85 parts of EVA 501, 15 parts of EVA 505 and 40 parts of Epolene ® E14. A Mayer rod applicator was used to apply a 3 to 10 lb./1300 ft$^2$ layer of this admixture to the barrier coated web. Upon completion an air-drying step at elevated temperature of this first film layer, a 1 to 4 lb./1300 ft$^2$ layer of 56220 Surlyn ® ionomer dispersion was applied using another Mayer rod application and then oven dried at about 250° F. to establish a laminate having a weight ratio between the first film layer and the ionomer layer of about 7:1.

The following flow chart summarizes the above steps of manufacturing the transfer web:

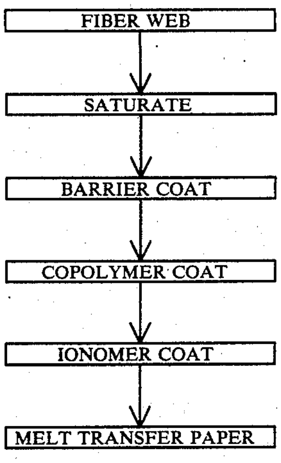

EXAMPLE 2—(Melt trnasfer method of printing fibrous workpieces.)

A prescribed inked pattern was formed on the top surface of the second film layer using an offset press and M & T 104 series offset transfer inks manufactured by M & T Chemicals, Inc. of Menasha, Wisconsin to form a printed transfer web.

A sheet of cotton fabric was placed over a flat compressible platen. A sheet of the printed transfer paper with the prescribed pattern printed thereon was brought into contact with the sheet of the cotton fabric so that the top surface of the paper was in registry with the sheet and the printed pattern mated with the desired region of the cotton sheet. A hot plate heated to a temperature of 350° F. was placed over the web sheet assembly for 10 seconds at a pressure of about 2 psi to hot press the paper to the sheet. At the elapse of the 10 seconds, the substrate of the melt transfer paper was pulled away from the assembly causing the printed pattern, the second film layer and the major portion of the first layer to be transferred to the cotton fabric sheet.

During the hot pressing, the emulsifiable polyethylene wax of the first film layer melted first, EVA resin of the first film coat melted second and the copolymer of Surlyn ® of the second film layer melted last. The pressure applied during the hot press caused the second film layer and the bulk of the first film layer to be pressed or and forced between the fibers of the cotton sheet holding the inked pattern is adhesive contact with the cotton sheet. Upon cooling to room temperature, the transferred inked pattern was sealed over the fibers of the cotton sheet.

As a consequence of the careful selection of polymers and copolymers and non-oxidizing inks having specific ranges of melt indexes, the various degrees of melting during the hot press occurred between the various constituent ingredients of the melt transfer paper causing the above-described reaction to occur.

EXAMPLE 3—(The melt transfer method of printing non-porous workpieces.)

A piece of metal was placed on the platen and a sheet of transfer paper with a prescribed pattern printed thereon was placed over it. The hot press operation was performed under the same conditions as in Example 2. Upon the elapse of time in the hot press, the substrate was pulled away. The second film layer and most of the first film layer was transferred to the contacted surface of the metal whereupon after cooling to room temperature, the second and first film layers heterogeneous mixture exhibited a strong adhesiveness to the non-porous surface, covering and bonding the transferred pattern to the metal.

The following flow chart summarizes the printing methods:

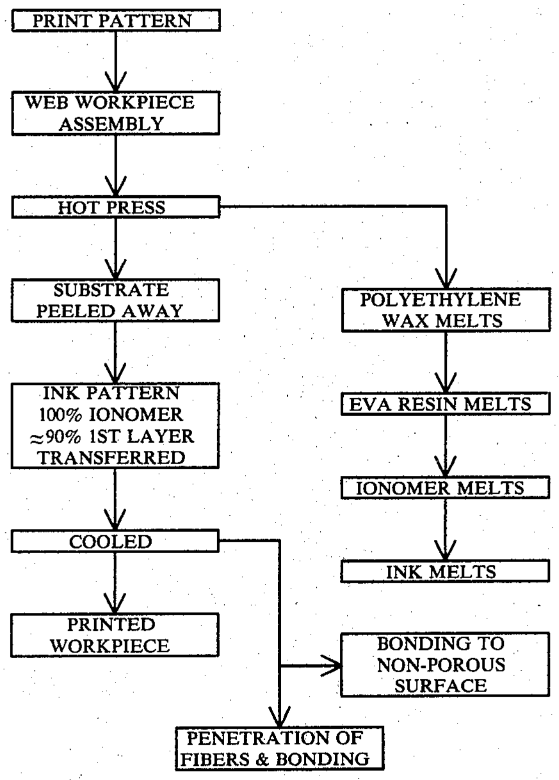

It is to be understood that the above-described embodiments are mainly illustrative of the principles of the invention. One skilled in the art may make changes and modifications to the embodiments disclosed herein and may devise other embodiments without departing from the scope and the essential characteristics thereof.

I claim:

1. An improved melt transfer web for decorating or printing selected patterns of inked graphics upon a surface of a porous, semi-porous or non-porous material workpiece, said web comprising:

(a) a flexible substrate of a heat-stable material having top and bottom surfaces;

(b) a first polymeric film layer disposed over said top surface of said substrate and comprised of a vinyl resin copolymer admixed with an emulsifiable polyethylene wax, said first film layer forming a heat softenable separable layer; and (c) a second polymeric film layer superposed over said first layer and comprised of an ionomer or a copolymer of ethylene acrylic acid, said second film layer having a top surface that is ink-receptive, said second layer being characterized by having a potentially adhesive property for permanently bonding the inked pattern to the surface of the workpiece, the adherent property being activated when said first and second film layers are heated and placed in pressure contact with the workpiece; said second layer forming a mechanical bond with said first layer, the mechanical bond between the layers having more internal strength when heat softened than the bond between said first layer and said substrate.

2. An improved melt transfer paper for decorating or printing prescribed inked patterns upon a surface region of a porous, semi-porous or a non-absorbent material workpiece, said transfer paper comprising:

(a) a flexible substrate comprised of a paper web saturated with a non-staining and non-thermosetting polymer;

(b) a layer of a passive barrier coating material coated over a top and a bottom surface of said saturated web comprised of a mixture of a polymeric binder and a clay;

(c) a first polymeric film layer disposed on said barrier coating material covering the top surface of said substrate comprised of a vinyl resin copolymer admixed with a polyethylene wax; and (d) a second polymeric film layer superposed over said first polymeric film layer comprised of an ionomer or a copolymer of ethylene acrylic acid, said second film layer having a top surface that is ink-receptive, said second layer being characterized by having a potentially adhesive property for permanently bonding the inked pattern to the surface of the workpiece, the adherent property being activated when said first and second layers are heated and placed in pressure contact with the workpiece; said second film layer forming a mechanical bond with said first film layer, the mechanical bond between the film layers having more internal strength when heat softened then the bond between said first film layer and said layer of barrier coating material coated over the top surface of said substrate.

3. A transfer paper as defined in claim 2 wherein said saturated paper substrate is a water leaf sheet of wood pulp fiber or alpha fibers saturated with a non-staining and non-thermosetting reactive acrylic polymer.

4. A transfer paper as defined in claim 2 wherein said layer of barrier coating material comprises a mixture of 25 to 60 parts of a polymeric acrylic latex with 100 parts of a selected clay.

5. A transfer paper as defined in claim 2 wherein said first polymeric film layer is comprised of a blend of from 100 to 60 parts by weight of a first ethylene vinyl acetate having a melt index of 350, 0 to 40 parts by weight of a second ethylene vinyl acetate having a melt index of 20 and 20 to 80 parts by weight of a polyethylene wax having a molecular weight of 1800 and a softening point at about 104° C. and wherein said first and said second ethylene vinyl acetates have a 28% content of vinyl acetate.

6. A transfer paper as defined in claim 2 wherein the weight of said first film layer is in the range of from 3 to 10 lbs./1300 ft$^2$, wherein the weight of said second film layer is in the range of from 1 to 4 lbs./1300 ft$^2$, and wherein the weight ratio between said first and second film layers is chosen to be approximately 7 to 1.

7. A transfer paper as defined in claim 5 wherein said first film layer is comprised of a blend of 85 parts by weight of said first ethylene vinyl acetate, 15 parts by weight of said second vinyl acetate and 40 parts by weight of said polyethylene wax.

8. A method for melt transfer printing prescribed inked patterns onto a surface of a porous, semi-porous, or non-porous material workpiece comprising the steps of:

(a) printing the prescribed ink patterns using conventional printing means on a top surface of a melt transfer web comprising a flexible substrate comprised of a paper web saturated with a non-staining and non-thermosetting polymer; a layer of a passive barrier coating material coated over a top and a bottom surface of said saturated web comprising a mixture of a polymeric binder and a clay; a first polymeric film layer disposed over the top surface of said substrate, and comprised of a vinyl resin copolymer admixed with a polyethylene wax, said first film layer forming a heat softenable separable layer; and a second polymeric film layer superposed over said first layer and comprised of a copolymer selected from the group consisting of an ionomer or an ethylene acrylic acid copolymer, said second film layer forming a heat-activated adhesive, said top surface of said melt transfer web being a top surface of said second film layer;

(b) placing the patterned side of said melt transfer web in contact with a top surface of the workpiece, forming a transfer web workpiece assembly;

(c) hot pressing said assembly for a given time, temperature and pressure so as to soften said first and second film layers;

(d) after said softening, immediately peeling away said substrate causing the inked pattern, the second film layer and a major portion of said first layer to be transferred to the workpiece, a minor portion of said first film layer being retained by said peeled away substrate; and then (e) air cooling to room temperature the transferred pattern and film layers, said cooling causing said films to solidify and to permanently bond said pattern to the workpiece.

9. A method as defined in claim 8 wherein the second film layer is characterized by having a potentially adhesive property for permanently bonding the inked pattern to the surface of the workpiece, the adherent property being activated when said web workpiece assembly is heated and placed under pressure during the hot pressing step.

10. A method as defined in claim 8 wherein said inked pattern, said second film layer and the major portion of said first film layer are forced on and inbetween the fibers of a porous or semi-porous workpiece during said hot pressing step.

11. A method as defined in claim 8 wherein said inked pattern, said second film layer and the major portion of said first film layer are bonded onto the top surface of a non-porous workpiece during said air drying step.

12. A method as defined in claim 8 wherein the bond between said first and second film layers has more internal strength when heat softened then the bond between said first layer and said substrate.

* * * * *